United States Patent Office 2,783,898
Patented Mar. 5, 1957

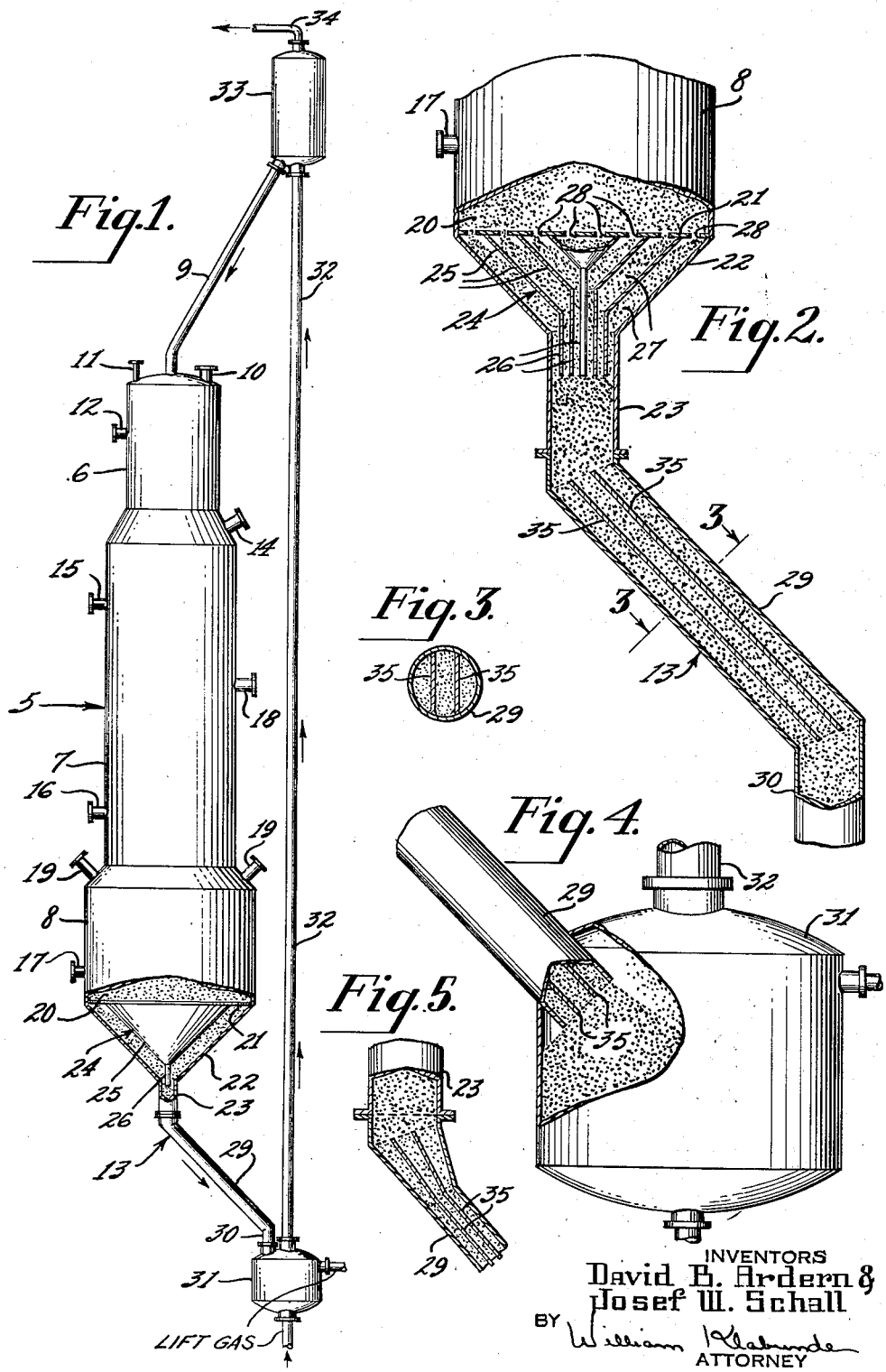

2,783,898

SOLIDS WITHDRAWAL SYSTEM

David B. Ardern, Moylan, and Josef W. Schall, Springfield, Pa., assignors to Houdry Process Corporation, Wilmington, Del., a corporation of Delaware Application July 6, 1951, Serial No. 235,494

9 Claims. (Cl. 214—17)

This invention relates to a method and apparatus for transferring granular solid material by gravity flow through a confined path from an elevated zone, wherein a controlled relationship of particle velocity is desired, to a lower zone.

The invention is particularly applicable to the petroleum refining and other chemical processing arts wherein solid contact material, such as catalyst, in the form of granules, pellets, beads, etc. is continuously circulated through a system comprising one or more gas-solids contact zones.

Typical of the hydrocarbon conversion systems to which the present invention is particularly applicable is that described and illustrated in an article entitled "Houdriflow: New Design in Catalytic Cracking," appearing at page 78 of the January 13, 1949 issue of the "Oil and Gas Journal."

The above-mentioned article discloses, briefly, a hydrocarbon conversion system in which the reactor is superimposed over the regenerator to form a single continuous downflow path including the various treating sections of the system. The catalyst is discharged from the bottom withdrawal section of the regenerator or kiln, and is passed through an inclined seal leg into a lift hopper comprising an introduction zone wherein the catalyst is engaged by a gaseous lift medium, such as flue gas, and conveyed thereby upwardly through a vertical lift pipe to an upper lift hopper comprising a catalyst disengaging zone situated at an elevation substantially higher than the upper end of the reactor. Catalyst disengaged from the gaseous lift medium by free settling within the upper lift hopper is continuously withdrawn from the lower region of the hopper through an inclined seal leg and passed into the upper end of the reactor.

The catalyst circulation rate within the system is controlled by regulation of the amount of lift gas introduced and the manner of its introduction into the catalyst engaging zone of the lower lift hopper. The invention, however, is not limited to a system in which the catalyst is pneumatically elevated. It is applicable also to systems in which the catalyst is mechanically elevated in known manner, as by a bucket-chain elevator, in which case the catalyst circulation rate may be adjustably controlled by a conventional valve at the lower end of the inclined catalyst draw-off line or seal leg leading to the elevator inlet.

Because of the relatively large size of the various vessels of systems as above-described, and the fact that they are often laterally as well as vertically spaced from each other, the transfer of solids by gravity flow from one vessel to another often requires confined passageways or conduits of substantial length, having both vertical and inclined portions. A typical example of such arrangement may be found in the catalyst transfer line connecting the catalyst discharge nozzle at the bottom of the kiln with the inlet to the lower lift hopper.

Although, as stated, the invention is of broad application to the transfer of solids in general, for the purpose of explaining and illustrating the invention, it will hereinafter be referred to in connection with a hydrocarbon conversion system employing granular catalyst, and specifically to the catalyst withdrawl system at the lower end of the kiln or regenerator.

One of the serious problems to be overcome in withdrawing catalyst from the bottom of the regenerator or kiln is to maintain such uniform catalyst flow from the bottom of the kiln into the draw-off line as will substantially preclude the formation of a velocity gradient horizontally across the catalyst bed in the lower region of the kiln. It has been found that when there is a substantial horizontal velocity gradient across the withdrawal section of the kiln there is an accompanying variation in residence or contact time of the catalyst in different regions of the kiln, resulting in a temperature gradient therein which adversely affects the operation of the process. For most efficient operation, it is desirable to have the particles of catalyst move downwardly through the kiln and through the catalyst withdrawal system at substantially uniform velocity over any horizontal cross-sectional area.

One of the known methods for obtaining uniform catalyst withdrawal through the bottom outlet nozzle of the kiln is to provide, in the case of a circular kiln, a plurality of annular concentric downwardly-converging paths extending from the bottom of the kiln bed to a location directly above the central opening in the lower end of the kiln, and from there downwardly through a corresponding plurality of concentric vertical annular paths to an intermediate level within the outlet nozzle connected to the central opening. Such flow path arrangement may be obtained by placing a nested series of spaced funnel-shaped members concentrically within the conical head and its associated nozzle at the bottom of the kiln. The catalyst passes downwardly from the bottom of the kiln bed through the frusto-conical paths between the conical body portions of the funnel-shaped members and then vertically downwardly through the annular paths in the discharge nozzle.

By means of this device the vertical velocity flow pattern in the outlet nozzle immediately below the termination of the funnels is translated directly into the kiln. If the vertical solid particle velocity is uniform across a horizontal plane in the discharge nozzle, then the vertical solid particle velocity is also uniform across a horizontal plane at a reasonable distance above the top level of the concentric cones in the kiln. Likewise, any non-uniformity in vertical solid particle velocity in the outlet nozzle is reflected back to the kiln to produce therein a corresponding and proportional non-uniformity in particle vertical velocity. The greater the number of concentric cones, the less the distance above the top of the cones at which the plane of uniform (or non-uniform) particle velocity is established, according to the nature of flow in the outlet nozzle. Typical of such systems is that disclosed in U. S. Patent No. 2,393,893.

The above-described withdrawal system has been found satisfactory for obtaining uniform catalyst flow from the bottom of the kiln to the discharge end of the outlet nozzle. Such uniformity of flow is thereafter maintained when the catalyst passes from the nozzle down a vertical seal leg. As mentioned, however, the physical arrangement of the apparatus in a typical system is usually such that, at most, a short vertical run from the nozzle is feasible, following which the catalyst must be conveyed along an inclined path to the lower lift hopper. From the lower end of the inclined portion of the seal leg the catalyst may pass through another short vertical run downwardly to the pneumatic lift, or the mechanical elevator, as the case may be.

It has been found that while uniform catalyst flow from the kiln is readily obtainable when the catalyst is discharged downwardly through a straight elongated vertical seal leg, the flow of catalyst is adversely affected when the draw-off line includes a portion substantially inclined to the vertical.

The restricted gravitating flow of solid particles in an inclined enclosed conduit is subject to the probability of wide variation in individual particle linear velocity across a given plane perpendicular to the axis of the conduit. The range of velocity variation extends clear to zero, or complete stagnation, at the lower end while the maximum velocity attained by any particle may be as high as the velocity of the corresponding material gravitating freely in a relatively thin layer down an open conduit, or chute, inclined at the same angle. The variation in velocity results from the different forces involved at successively deeper levels in the pipe. The solid particles which are located, instantaneously, at the uppermost level of the pipe move down an inclined path parallel to the axis of the pipe, whenever the angle of the pipe above horizontal is sufficient so that the component of the force of gravity in the direction of flow is sufficient to overcome the solid-solid friction. The next layer of catalyst above the uppermost will flow also in an inclined path parallel to the axis of the pipe provided the component of the force of gravity in the direction of flow is greater than the solid-solid friction which is now substantially increased due to the total weight of solid supported, in comparison with the uppermost layer. Successively deeper layers of solids must overcome correspondingly greater solid-solid friction as the mass of solid supported above increases. Complete stagnation occurs at that level where the component of gravitation in the direction of flow is insufficient to overcome the solid-solid friction existing.

Experiments have shown that in the flow of approximately 4–10 mesh bead catalyst through a 12" pipe inclined at an angle of 55° above horizontal, the catalyst at the top of the pipe flowed at a velocity of several feet per second, while the linear velocity of the catalyst decreased with incresing depth until a zero flow line was reached about 6" deep. Below that level there was no flow, even though the quantity flowing was equivalent to a superficial velocity of one foot per second on the total pipe area.

The exact velocity profile which will develop is a function of many factors, including the physical properties of the catalyst, size, shape, density, character of surface, etc., the angle of inclination, and in minor degree the quantity flow rate size of conduit and nature of the inner surface of the conduit, and the presence of a gas flow either concurrent or countercurrent to the solids flow.

Now in a system where solids flow from a vertical pipe into an inclined pipe, the flow at the bottom of the vertical run will be non-uniform to the same extent that uneven flow occurs in the inclined pipe. Considerable length of vertical pipe, as much as several pipe diameters, may be required to establish a plane of uniform particle velocity. With a short vertical outlet nozzle on the bottom of a kiln as described above, the concentric cone arrangement transmits whatever flow condition exists in the nozzle directly into the kiln. Therefore it is necessary to have satisfactory flow in the inclined pipe in order to assure correct operation of the kiln.

In accordance with the invention, an adverse velocity gradient within the seal leg may be avoided by separating the flow of catalyst through the inclined portion into a plurality of streams superimposed one above another. Such separation is effected in the region of stream deflection, that is, at the juncture of the upper vertical portion of the seal leg with the inclined portion. Preferably, though not necessarily, the streams are of substantially equal depth, measured along a diameter of the inclined conduit, and the stream separation is effected in a plane at the juncture of the vertical and inclined sections which will assure a distribution of catalyst flow into the various channels substantially proportionate to the flow area distribution in the inclined portion of the seal leg.

The inclined portion of the seal leg may be of any desired cross-section, and may taper downwardly over its full length or for a short distance at its upper end. If the seal leg is tubular, the flow path is divided by parallel longitudinal baffles. If it is tapered, the baffles are convergent rather than parallel, so that the velocity profile will be similar at both ends of the tapered portion. The plurality of superimposed streams may expand upon discharge from the lower end of the inclined conduit to form a compact moving bed of considerably increased cross-sectional area, or the inclined conduit may be connected at its lower end to a vertical conduit within which the plurality of streams flowing through the inclined conduit may be united to form a downwardly moving column. Preferably, in the latter case, the inclined and lower vertical conduits are joined in a miter connection, and the longitudinal baffles terminate at the miter plane. In this way a uniform velocity profile is maintained throughout the inclined and vertical portions of the seal leg.

When the lower end of the inclined portion of the seal leg is not connected to a vertical conduit, but discharges directly onto the surface of an expanded moving bed, as where it connects directly into the lower lift hopper of a pneumatic lift, the lower end of the inclined portion may be cut off at any convenient angle. It is necessary, however, that the means, such as baffles, for effecting stream separation within the inclined conduit be coextensive therewith to its lower end. Regardless of the baffle spacing, or the fact that they are convergent because the inclined tube is wholly or partly tapered, the relative proportion of the flow areas of the separate catalyst streams within the inclined portion of the seal leg should be the same at both ends of the inclined portion of the seal leg. Although the stream separation in the inclined section may be made on the basis of flow area as well as lateral spacing, the latter division is preferred, the streams being of approximately equal maximum depth, not to exceed about seven inches. The advantages of operation and construction in accordance with the invention are realized regardless of an adverse pressure gradient within the seal leg.

A fuller understanding of the novel method of this invention and of suitable means for carrying it out may be had by reference to the following description and claims taken in connection with the accompanying drawing forming a part of this application, in which:

Figure 1 is a schematic view showing in elevation a typical hydrocarbon conversion system including a catalyst draw-off system to which the present invention may be applied; Figure 2 is an enlarged diagrammatic view showing the lower portion of the catalyst withdrawal and transfer system at the lower end of the unitized reactor-regenerator of Figure 1, including a seal leg representing one embodiment of the present invention; Figure 3 is a cross-sectional view of the inclined portion of the seal leg taken along the line 3—3; Figure 4 is a diagrammatic view showing a modification wherein the inclined portion of the seal leg discharges directly into the lift engager; and Figure 5 shows a modification of the seal leg.

Referring to the drawing, the various treating or contact zones of the hydrocarbon conversion system are housed within a single elongated vessel 5 comprising upper, intermediate, and lower sections 6, 7 and 8, respectively. The vessel 5 includes in descending order a reaction zone within section 6, vapor disengaging and catalyst purging zones at the upper end of section 7, and a regeneration zone extending through sections 7 and 8.

At the bottom of vessel 5 the catalyst passes through a withdrawal system and transfer line to the inlet end of a mechanical or pneumatic conveyor, the latter being illustrated, through which the catalyst is returned to the upper end of the vessel 5.

Catalyst in the form of granules, pellets, or beads of a particle size above about fourteen mesh, is introduced into the upper end of vessel 5 through a seal leg 9 connected at its upper end to the upper lift hopper of the pneumatic lift. The catalyst gravitates within the reaction zone at the upper end of vessel 5 as a compact moving bed. Within the reactor bed the catalyst is contacted, at temperatures normally in the range of 800–925° F., with the hydrocarbons to be converted, the hydrocarbon charge being introduced either in completely liquid phase or in admixture with vaporous hydrocarbons through the inlet 10 at the upper end of the vessel. Sealing gas, in known manner, may be introduced into the upper end of the reactor through an inlet 11 at the upper end of the vessel in order to prevent a migration of gaseous reactants or products of reaction from the reaction zone upwardly out of the vessel 5 through the seal leg 9. Should it be desired to introduce completely vaporous hydrocarbons into the reaction zone, either alone or in conjunction with the aforementioned liquid charge, their introduction may be effected through inlet 12 in the side of upper vessel portion 6, the engagement between the catalyst and the hydrocarbon vapors within the reaction zone being effected in known manner.

Within the reaction zone the catalyst is maintained as a compact moving bed of enlarged cross-sectional area. From the bottom of the reactor bed the catalyst passes downwardly in compact mass flow through the remaining sections 7 and 8 of the vessel 5, and downwardly through the lower seal leg, generally indicated by the numeral 13, to the lower lift hopper of the pneumatic lift. In passing downwardly from the bottom of the reactor bed through sections 7 and 8 of the vessel 5, the catalyst first passes through a catalyst-vapor disengager wherein the gaseous reaction products accompanying the spent catalyst are separated from the latter and separately withdrawn from the vessel 5 through vapor outlet 14.

The disengaged spent catalyst then gravitates through a purging zone wherein the catalyst is contacted with purging gas, such as steam, introduced through inlet 15 at the side of the vessel. The purging gas in known manner passes upwardly through the catalyst mass into the disengaging section, concomitantly displacing the hydrocarbon vapors and flowing therewith out of the vessel through the vapor outlet 14. After passing through the purging zone the catalyst gravitates through one or more elongated seal leg conduits, not shown, of a size and length adapted to contain sufficient catalyst to provide a substantial resistance to gas flow therethrough, into the regeneration zone within the intermediate and lower sections 7 and 8 of the vessel 5. In known manner, the spent catalyst is contacted within the regeneration zone with oxygen-containing gas introduced into the upper regeneration stage through inlet 16 and into the lower regeneration stage through inlet 17, for countercurrent flow through the catalyst. Within the regeneration zone the carbonaceous deposit which was formed on the catalyst during the hydrocarbon conversion is removed by combustion, and the gaseous regeneration products, or flue gases, are separately removed from the vessel 5. Flue gas from the upper stage of regeneration is removed through outlet 18, and flue gas from the lower stage is removed through outlet 19.

As shown in the broken away portion of Figure 1, and as diagrammatically illustrated in the enlarged view of Figure 2, the catalyst bed 20 within the lower section 8 of the vessel 5 may be supported on a perforate plate or grid 21 extending horizontally across the vessel 5 at the juncture of section 8 with the conical head 22 closing the bottom of the vessel and provided with a nozzle 23 depending centrally from the conical head 22 to provide a catalyst outlet. The perforations in plate or grid 21 may comprise, for example, concentric circumferential rows of holes, or slots. It is to be understood, however, that other types of flow plate, such as a flat or a dished tube-sheet, may be employed. Or, the flow plate may be eliminated, since it is not essential to the operation of the invention.

Within the conical head 22 at the bottom of the vessel 5, a series of funnel-shaped members 24 having upper conical portions 25 and lower tubular portions 26 are arranged in spaced, nested relationship. The upper ends of the funnels are located immediately below the grid 21, while the lower ends extend downwardly into the nozzle 23, thereby forming a plurality of concentric annular catalyst passages 27 extending from the underside of the grid 21 to an intermediate level within the discharge nozzle 23. The perforations 28 in the grid 21 are arranged in a series of circular rows, each row being centrally positioned above one of the annular passages 27. The innermost funnel of the nested group forms a passage of circular cross-section leading into the nozzle 23. The perforations 28 are of such size and distribution over the area of the grid as to effect a substantially uniform withdrawal of catalyst over the entire lower region of the catalyst bed 20. The operation of the withdrawal system thus far described is such that normally the flowing catalyst particles in any horizontal cross-sectional area of the bed 20 descend at substantially uniform velocity, thus tending to provide an equal residence time for all particles of catalyst within the regeneration zone.

The nozzle 23 at the lower end of vessel 5 provides a relatively short vertical path for the catalyst discharging from the lower ends of the concentric annular passages 27. In order to convey the withdrawn regenerated catalyst laterally downwardly to the introduction chamber or lower lift hopper of the pneumatic lift an inclined conduit 29 is connected at its upper end to the lower end of nozzle 23. A short vertical conduit 30 connects the lower end of the inclined conduit 29 to the lower lift hopper 31. Alternatively, however, as diagrammatically illustrated in Figure 4, the lower vertical conduit 30 may be omitted, and the catalyst may discharge from the lower end of inclined conduit 29 directly onto a moving catalyst bed maintained within the lower lift hopper.

In the particular embodiment illustrated in the drawing, the conveyor for elevating the catalyst comprises a pneumatic lift wherein the catalyst is engaged by a gaseous lift medium in an introduction zone within the lower lift hopper 31, and is conveyed thereby upwardly through a lift pipe 32 to an upper lift hopper 33 containing a disengaging zone. Within the upper lift hopper the catalyst is disengaged from the lift gas by free settling. The separated lift gas is discharged overhead from the upper lift hopper through outlet 34, and the catalyst which has settled in the lower region of the hopper is withdrawn therefrom and passed downwardly through seal leg 9 to the upper end of vessel 5.

Although a pneumatic lift has been illustrated and described herein, it is to be understood that other known means for elevating the catalyst to the upper end of the vessel 5 may be provided. Furthermore, although the transfer line for conveying catalyst from the discharge nozzle of the withdrawal section to the lift engager shown in the illustrated embodiment may be referred to as a seal leg, it is to be understood that the invention is equally applicable in systems where a gas seal is not required in the transfer line.

Although the illustrated embodiment shows a transfer line having a flow area equal to that of the discharge nozzle 23, it is obvious that a reducer may be inserted at the lower end of the nozzle without adverse effect upon the operation of the improved seal leg.

It has been demonstrated that when a seal leg is inclined to the horizontal at an angle in the range of about 45°–70° a vertical conduit of substantial length is required between the bottom of the withdrawal cones or funnels and the upper end of the inclined seal leg in order to obtain a uniform flow of catalyst throughout the withdrawal system. For example, it has been found that a 48° seal leg of a diameter in the range of about 25–30 inches may require a vertical run of about eleven feet at its upper end in order to obtain uniform flow from the withdrawal cones.

Such vertical distance, however, is not normally available, because of space limitations, either in the modification of existing commercial installations or in the design and fabrication of new units.

Where the vertical run between the lower ends of the cones and the upper end of the inclined seal leg is relatively short, there is a tendency for the irregularity of flow in the inclined conduit to be reflected upwardly through the vertical conduit and through at least a portion of the cone system.

As the catalyst passes downwardly along the inclined path, a layer of stagnant catalyst is formed along the bottom, which layer may be of such depth as to substantially reduce the flow area of the inclined conduit, for example, by about as much as one half, or more. Such stagnation is reflected upwardly along the back wall of the vertical conduit, that is, the wall opposite the direction of catalyst deflection, to form a stagnant layer therealong having its surface inclined at an angle in the range of about 65°–80°, dependent upon various factors. The layer of catalyst formed along the back wall of the vertical conduit may in some cases extend upwardly to the discharge ends of the cones, thereby cutting off a portion of the flow, at least in the outer cones. It has been observed that the effects of such interrupted flow are reflected upwardly through the withdrawal system and for some distance into the kiln bed. As a result of such stagnation, a substantial horizontal gradation in velocity is created throughout the remaining cones, the velocity of flow being lowest in the region immediately adjacent to the stagnant layer, and increasing toward the opposite side of the vertical conduit. Near the opposite wall of the conduit the velocity may decrease rapidly, but the flow normally will be faster than it is near the stagnant layer. In some cases gradation may be such that the highest velocity is about five times the value of the lowest observable velocity. The velocity profile may, of course, vary within wide limits, and it is to be understood that the foregoing is presented as being illustrative.

The stagnant layer of catalyst along the bottom of the inclined conduit extends the full length thereof, but gradually decreases in depth. In the moving layer of catalyst there is both particle-size and velocity gradation, increasing toward the upper side of the inclined conduit.

After the installation of internal longitudinal baffles 35 coextensive with the inclined conduit, the flow of catalyst in the vertical and inclined conduits was considerably more uniform. Stagnation of catalyst along either the bottom of the inclined conduit or upwardly along the back wall of the vertical section was negligible.

For example, it has been demonstrated that in a system employing a seal leg inclined at an angle of 55°, with full-length longitudinal baffles laterally spaced a distance of about 4¾ inches and a vertical distance of about 3½ ft. between the bottom of the cones and the upper end of the inclined section, a flow of plant-aged bead catalyst at a rate of about 880 lb./min. and with adverse pressure gradients of 1.2" $H_2O$/ft. in the inclined leg and 1.3" $H_2O$/ft. in the vertical leg produced a substantially uniform velocity of flow throughout the cross-sectional area of the vertical section, although a slight frictional drag was noticeable along the side walls of the vertical section at the bottom of the cones. Such reduction, however, was less than half of the average velocity across the leg. In the inclined leg, the catalyst moved without any substantial velocity gradient measured normal to the direction of flow, although the velocity of movement along the bottom of each longitudinal stream was slightly below that along the upper side.

Although, as stated above, the invention is applicable to systems in which the inclined seal leg may be arranged at an angle of between about 40°–75° from the horizontal, and in which the lateral baffle spacing may be as high as seven inches, in commercial practice, the inclined seal leg is usually within an angle of 45°–55°. Within this range of angularity it is preferred that the lateral baffle spacing be in the range of about 4½–5¾ inches.

Since the cylindrical portions 26 of the funnel members 24 extend into the nozzle 23, the latter will normally be of greater diameter than the seal leg, thus requiring a reducer in the line 13. Such reduction in flow area may be made by providing a short tapered section at the upper end of the inclined seal leg portion 29, preferably at the elbow as shown in Figure 5, or by making the entire tube 29 tapered instead of cylindrical. In a cylindrical tube or portion thereof, the baffles 35 will of course be parallel. In a tapered tube or portion thereof the baffles will be convergent so as to maintain the same flow pattern throughout.

When the inclined seal leg portion 29 is connected at its lower end to a vertical section, such as 30, the baffles 35 may terminate at the miter plane or they may extend vertically downwardly therefrom. If the inclined tube discharges directly onto an expanded bed, as shown in Figure 4, the inclined tube may be cut off at any suitable angle, the baffles 35 being coextensive with the tube. In any case, it is desired that the velocity profile at the upper end of the baffle section be maintained throughout the length of the inclined tube.

By the method and apparatus of the present invention, it is possible to effect a continuous movement of catalyst or other contact material in the form of a compact flowing mass from the lower end of a bed contained within a contact zone to a second zone at a substantial distance below and to one side of the contact zone, without serious adverse effect upon the uniformity of flow or velocity profile either within the bed or at points within the transfer system where irregularity of flow might be reflected backwardly into the bed. The invention is effective in the presence of adverse pressure gradients in the seal leg up to the maximum pressure gradient obtainable. While one or more cavitations may be produced along the top of the longitudinal channels as the catalyst flow rate through the transfer system increases, they do not, for all normal circulation rates, adversely affect the flow of catalyst from the bed. Operation in accordance with the present invention makes it possible for granular material to be passed downwardly as a compact uniformly moving stream, regardless of joints or deflections in the path of flow.

Obviously many modifications and variations of the invention as hereinbefore set forth may be made without departing from the spirit and scope thereof and therefore only such limitations should be imposed as are indicated in the appended claims.

We claim:

1. A system for transferring granular contact material discharging downwardly from an upper zone as a confined compact moving stream of substantially uniform velocity throughout its flow area to a lower zone spaced below and to one side of said upper zone comprising a vertical conduit adapted to receive and extend the confined downward flow of said compact stream, an inclined conduit connected at its upper end to said vertical conduit and extending laterally downwardly to said lower zone, and a plurality of laterally spaced longitudinal baffles secured one above another within said inclined conduit to form a plurality of superimposed passages coextensive with said inclined conduit, said baffles being arranged to divide said confined stream of material into a plurality of separate confined streams such that the cross-sectional velocity pattern is substantially duplicated at both ends of said inclined conduit.

2. A system as defined in claim 1 in which said longitudinal baffles throughout their length are substantially uniformly spaced in a cross-sectional plane normal to the longitudinal axis of said inclined conduit.

3. A system as defined in claim 2 in which the lateral spacing of said longitudinal baffles is less than seven inches.

4. A system as defined in claim 1 in which at least the initial portion of said inclined conduit is tapered to effect a gradual reduction of total flow area, and said baffles are arranged within the tapered portion to provide a substantially identical cross-sectional pattern of flow at each end of said tapered portion.

5. A system as defined in claim 1 in which said vertical conduit is of such length that the projected longitudinal axis of said inclined conduit intersects the side wall of said vertical conduit at a point substantially below the upper end of said confined compact moving stream.

6. A conduit for conveying granular material as a continuous compact moving stream from the lower end of a vertical discharge pipe to a receiving zone located laterally below said lower end, and in such positional relation thereto that a line from said lower end to said receiving zone is inclined at an angle of about 40° to 75° to the horizontal, comprising: a pipe section of uniform cross-sectional flow area having its upper end mitered for connection to said lower end of said discharge pipe, and a plurality of longitudinal baffles extending the length of said pipe section and being arranged to divide said pipe into a plurality of separate, superimposed material-conveying channels for conveying said material as separate moving layers from the plane of miter to said receiving zone.

7. A conduit as defined in claim 6 in which said baffles are so arranged within said pipe section as to duplicate the cross-sectional flow areas at each end of said channels.

8. A conduit as in claim 6 having its upper end portion expanded gradually outward, and having the portions of said baffles located within said expanded portion so inclined to the axis of said conduit that the flow areas of said channels at the upper end of said conduit will be substantially in the same proportion as the flow areas of said channels at the lower end of said conduit.

9. A conduit as in claim 6 having its lower end mitered for connection to the upper end of a second vertical discharge conduit communicating at its lower end with said receiving zone.

References Cited in the file of this patent

UNITED STATES PATENTS

| | | |
|---|---|---|
| 926,702 | Korting | June 29, 1909 |
| 2,393,893 | Evans et al. | Jan. 29, 1946 |
| 2,412,135 | Evans | Dec. 2, 1946 |
| 2,494,794 | Bonnell | Jan. 17, 1950 |
| 2,506,545 | Crowley | May 2, 1950 |
| 2,531,192 | Bergstrom | Nov. 21, 1950 |